F. V. McDONNELL.
HUB FACING ATTACHMENT FOR CAR WHEEL BORING MILLS.
APPLICATION FILED OCT. 24, 1913.
1,090,739.
Patented Mar. 17, 1914.
3 SHEETS—SHEET 1.
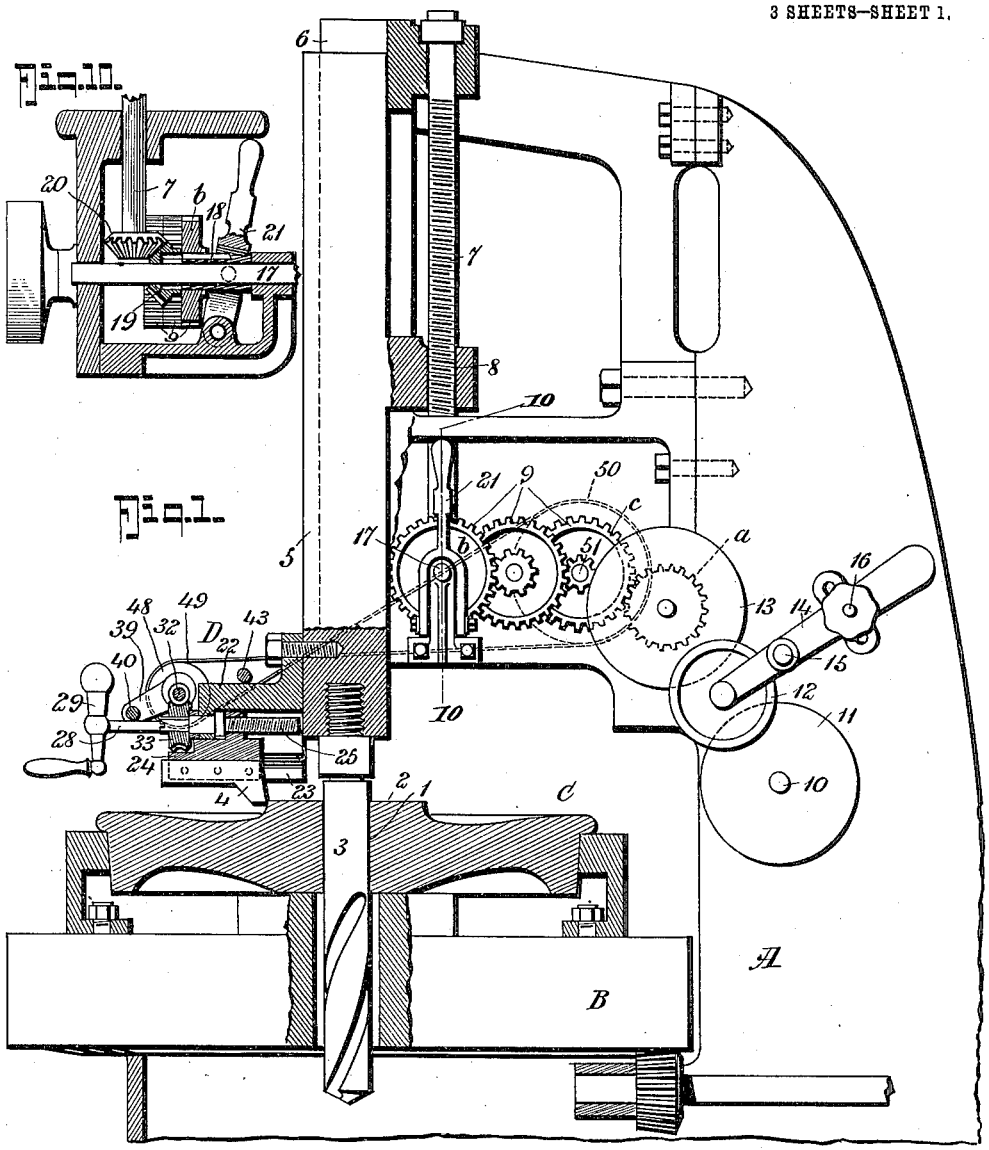
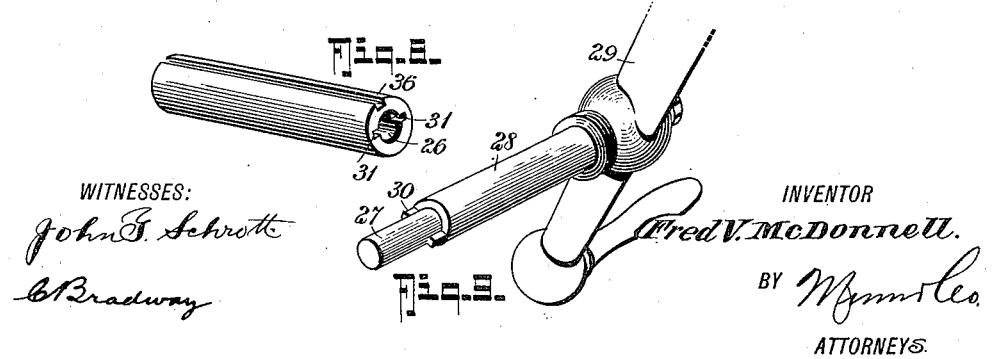
WITNESSES:
John T. Schrott
C. A. Bradway
INVENTOR
Fred V. McDonnell.
BY
ATTORNEYS.

F. V. McDONNELL.
HUB FACING ATTACHMENT FOR CAR WHEEL BORING MILLS.
APPLICATION FILED OCT. 24, 1913.
1,090,739.
Patented Mar. 17, 1914.
3 SHEETS—SHEET 2.
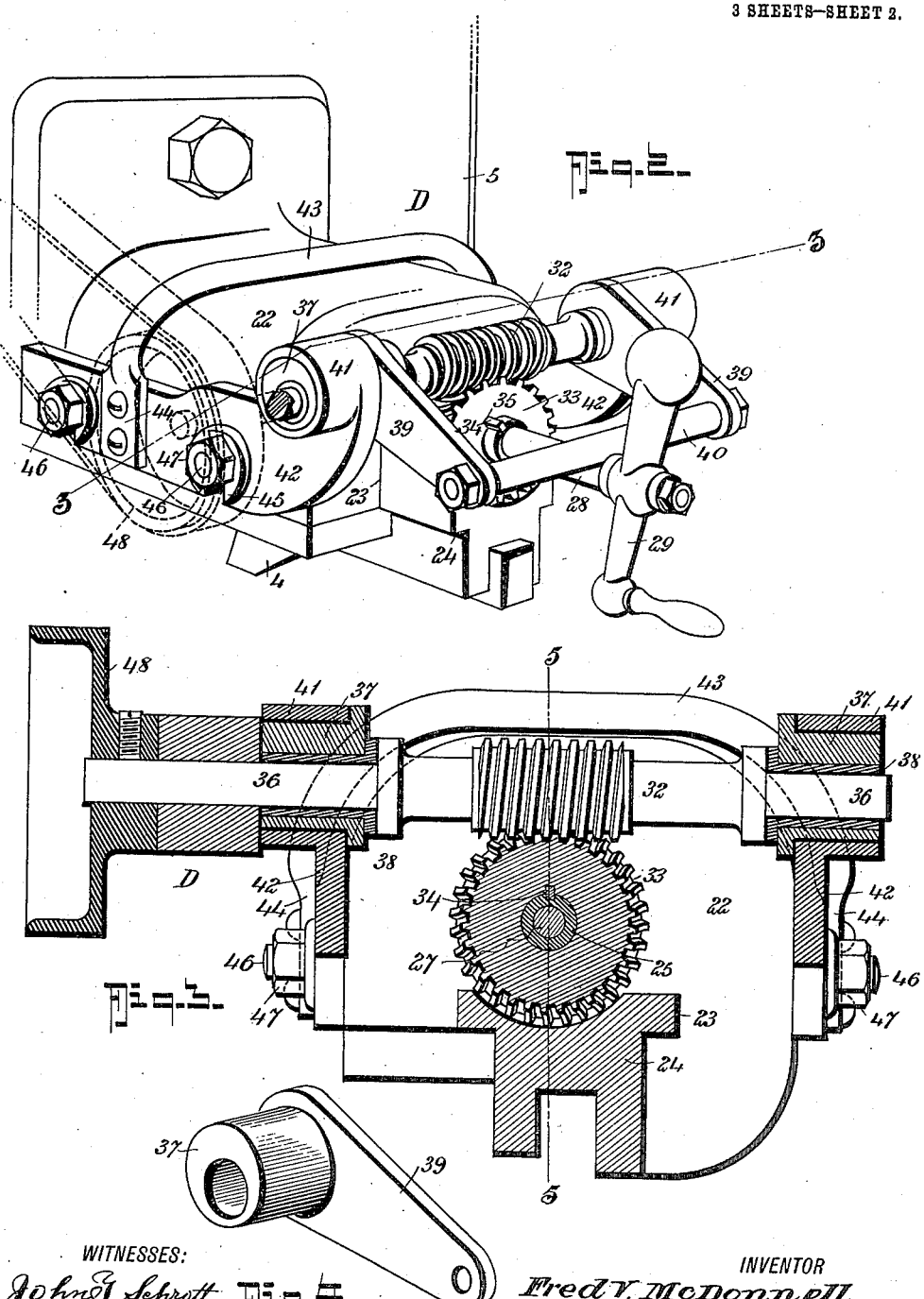
WITNESSES:
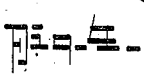
INVENTOR
Fred V. McDonnell.
BY 
ATTORNEYS.

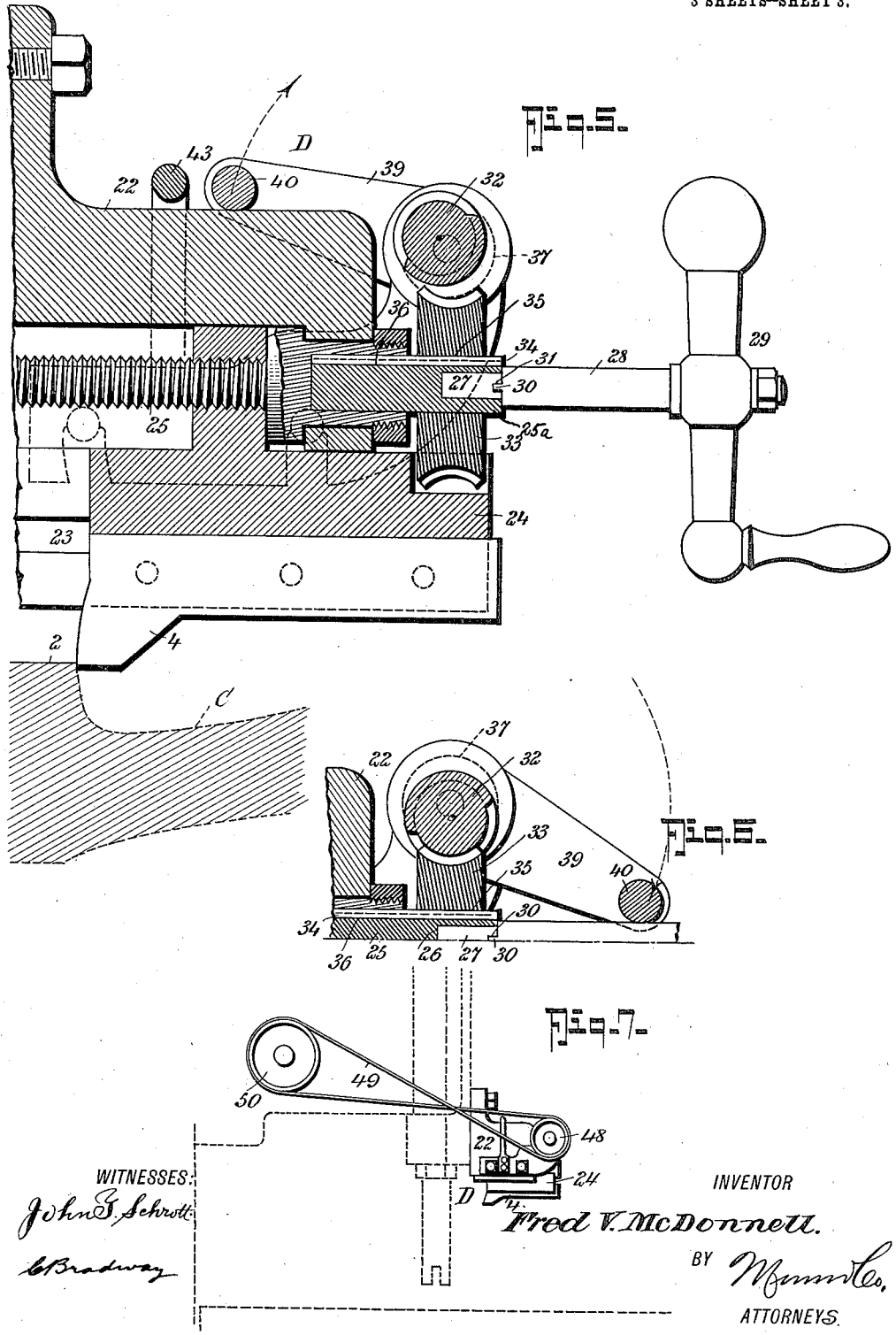

UNITED STATES PATENT OFFICE.

FRED VANCE McDONNELL, OF LOGANSPORT, INDIANA.

HUB-FACING ATTACHMENT FOR CAR-WHEEL-BORING MILLS.

1,090,739.

Specification of Letters Patent.

Patented Mar. 17, 1914.

Application filed October 24, 1913. Serial No. 797,043.

*To all whom it may concern:*

Be it known that I, FRED V. McDONNELL, a citizen of the United States, and a resident of Logansport, in the county of Cass and State of Indiana, have invented a new and Improved Hub-Facing Attachment for Car-Wheel-Boring Mills, of which the following is a full, clear, and exact description.

This invention relates to boring mills of that type used for boring car wheel hubs and for turning the face of the hub.

The general object of the present invention is to provide an attachment whereby the feed screw for the facing cutter can be power-driven so as to relieve the operator of the work of turning the screw, it being merely necessary for the operator to initially adjust the facing cutter and then interrupt the feed of the latter when the cut has been completed.

Another object of the invention is the provision of a power feed attachment for the facing cutter of a car wheel boring mill, in combination with means for manually throwing out of operation the automatic feed, whereby the feed screw can be operated by hand.

Still another object is the provision of driving means for the automatic feed mechanism for the facing cutter, such driving means being combined with the driving gearing for the screw that feeds the boring tool, by reason of which combination a clutch is provided for disconnecting the driving means from the boring tool feed screw so that the boring tool will remain idle after the boring is completed, to thereby enable the facing tool to be operated by the said driving means.

With such objects in view, and others as will appear as the description proceeds, the invention comprises various novel features of construction and arrangement of parts which will be set forth with particularity in the following description and claims appended hereto.

In the accompanying drawings, which illustrate one embodiment of the invention, and wherein similar characters of reference indicate corresponding parts in all the views, Figure 1 is a side view with parts in section of a car wheel boring mill, showing the boring operation completed and the facing operation about to begin; Fig. 2 is a perspective view of the attachment shown applied to the usual facing tool head; Fig. 3 is a vertical section on the line 3—3, Fig. 2; Fig. 4 is a perspective view of one of the eccentric bearings for disconnecting the power from the facing tool feed screw; Fig. 5 is a vertical section on the line 5—5, Fig. 3, showing the feed screw disconnected from the driving means; Fig. 6 is a similar fragmentary section showing the feed screw connected with the driving means; Fig. 7 is a detail side view showing the manner of belting the hub facing attachment with the boring mill; Figs. 8 and 9 are detail perspective views of the outer end of the feed screw and the hand device for turning the screw; and Fig. 10 is a detail sectional view on the line 10—10, Fig. 1, showing the manner of disconnecting the driving gearing of the machine from the boring tool feed screw.

Referring to the drawing, A designates the frame of the boring mill on which is rotatably mounted a bed or work carrier B that has clamped thereto a car wheel C having its axle opening or hub 1 bored and its face 2 turned. The boring tool 3 is shown as having completed the boring and the facing tool 4 is about to begin the truing of the facing 2. The boring tool 3 is fastened to the lower end of a vertical slide or carrier 5 movable in a guideway 6 and adapted to be fed by a rotating screw 7 which has a threaded engagement with a lug 8 projecting from the carrier 5. The screw 7 is rotated during the boring operation and during the retraction of the tool from the car wheel hub, and while the facing tool is operating, the boring tool is idle. A train of gears 9 serves to multiply power derived from a driving shaft 10, which, by means of friction disks 11, 12 and 13, is capable of imparting a variable speed to the boring tool as well as to the facing cutter. The friction disk 12 is carried by a lever 14 which is fulcrumed at 15 and is held in any desired position of adjustment by a set screw 16. By throwing the intermediate disk 12 toward the axis of the disk 13, the speed ratio is increased, whereas reverse movement decreases the speed. The friction disk 13 is connected with the first gear $a$ of the train of gears 9, and the last gear $b$ of the train of gears is mounted on a shaft 17 which is provided with a sliding sleeve 18, Fig. 10, splined to the last gear $b$ of the train of gears. On the shaft 17 is a miter gear 19 which is adapted to be coupled to the gear wheel b by the sleeve 18 when the latter is thrown to the left, Fig. 10, such miter gear 19 being permanently in mesh with the miter gear 20 on the lower end of the feed screw 7 of the boring tool. The sleeve 18 is operatively connected with a lever 21 by which the sleeve 18 can be moved back and forth to clutch or unclutch the gears b and 19. When these gears are unclutched, as shown in Fig. 10, the boring tool 3 is idle and power can be derived from the driving shaft 10 through the train of gears 9 to effect the feed of the facing cutter.

The hub facing mechanism D is mounted on the boring tool carrier 5 and comprises a bracket or body 22 that has a horizontal guide 23 for the carrier 24 in which the facing cutter 4 is mounted. Journaled in the body 22 is a screw 25 which moves the carrier 24 inwardly or outwardly with respect to the hub of the wheel C.

The front end of the screw has therein a member 25ª that is provided with a socket 26, Figs. 5 and 8, to receive the reduced end 27 of the stem 28 of the handle or hand-operated device 29, there being lugs 30 at the inner portion of the reduced ends 27 to engage in recesses 31 of the sockets 26, whereby the hand-operated device can be keyed to the feeding screw 25. By this means the feed screw can be manipulated for moving the facing cutter 4 in initially adjusting the latter with respect to the work or in feeding the cutter by hand. The means for automatically operating the feed screw 25 includes a worm 32 that meshes with a worm wheel 33 fastened to the feed screw 25 by a key 34 which enters key slots 35 and 36 in the worm 33 and screw 25, respectively. The ends of the screw 32 are formed into journals 36 that are disposed in eccentric bushings or bearing members 37 that have alining sleeves 38. These bushings 37 are formed with arms 39 which are connected rigidly together by a handle bar 40. This handle bar rests on the stem of the hand-operating device for the feed screw 25 when the worm 32 is meshing with the worm wheel 33, so that when the handle bar 40 is thrown upwardly and backwardly from the position shown in Fig. 6 to that shown in Fig. 5, the eccentric bushings 37 raise the worm out of engagement with the worm wheel so as to disconnect the facing tool feed screw from the source of power. The eccentrics 37 are rotatably mounted in bearings 41 formed on the forward extremities of side frame members 42, which members are united by a bridging bar or element 43 that has downwardly-turned ends 44 secured to the members 42, whereby the latter and bridging bar 43 form the frame of the attachment. The side members 42 are applied to the sides of the body 22 of the hub facing mechanism, and the bar 43 extends over the body 22. The side members 42 are provided in their lower edges with vertical slots 45 to fit over studs 46 fastened to the sides of the body 22, there being nuts 47 on the studs to clamp the side members 42 in place. One journal 36 of the worm shaft has fastened thereto a pulley 48 which is driven by a cross belt 49 from a pulley 50 secured to the opposite end of the shaft 51 on which the second gear c of the train of gears 9 is fastened. It will thus be seen that power for driving the feed screw of the facing mechanism D is derived from the shaft 10, which drives the feed screw for the boring tool. Obviously, when the boring tool is in operation the worm 32 will be in inoperative position, as shown in Fig. 5, so that the facing tool will not be fed, and during this feeding of the boring tool the lever 21, Fig. 10, will be shifted to the left. When the boring has been completed the lever 21 is shifted to the right and the worm is thrown from inoperative position, shown in Fig. 5, to the operative position shown in Fig. 6. It will be understood, however, that the worm turns continuously during the boring operation, but of course it does not feed the facing tool because the worm is in the position shown in Fig. 5. When the worm is also in this position the facing tool feed screw can be manually operated without the worm interfering.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A car wheel boring mill comprising a boring tool holder, a feed screw therefor, a driving mechanism, and means for clutching and unclutching the mechanism and screw, in combination with a hub facing attachment including a facing tool holder, a feed screw therefor, a gearing for driving the screw including a worm and worm wheel, means for movably mounting the worm of the gearing to engage and disengage the wheel, and a driving connection between the movable element of the gearing and the driving mechanism of the boring mill.

2. The combination of a car wheel boring mill including a boring tool carrier, in combination with a hub facing attachment mounted of the carrier, said attachment comprising a facing tool holder, a feed screw therefor, a worm wheel on the screw, a worm movably mounted to engage or disengage the worm wheel, and means for throwing the worm into and out of mesh with the wheel.

3. The combination of a car wheel boring mill including a boring tool carrier, in combination with a hub facing attachment mounted on the carrier, said attachment comprising a frame, a worm, eccentric bushings in which the worm is mounted, means for turning the bushings to shift the worm to and from operative position, a worm wheel with which the worm is adapted to mesh, a feed screw operatively connected with the worm wheel, and a facing tool holder operated by the feed screw.

4. The combination of a car wheel boring mill including a boring tool carrier, in combination with a hub facing attachment mounted on the carrier, said attachment comprising a body, a frame detachably mounted on the body, a facing tool holder on the body, a feed screw mounted on the body and arranged to feed the holder, a worm wheel on the screw, a worm adapted to mesh with the worm wheel, eccentric bushings in which the worm is rotatably mounted, a handle connecting both bushings together and movable to throw the worm into and out of mesh with the worm wheel, and means for rotating the worm.

5. The combination of a car wheel boring mill including a boring tool carrier, in combination with a hub facing attachment mounted on the carrier, said attachment comprising a body, a tool holder slidably mounted thereon, a screw for feeding the holder, a hand-operated device connected with the screw for turning the same, a worm wheel on the screw, a worm movable into and out of mesh with the worm wheel, a frame mounted on the body, eccentrics journaled in the frame and in which the worm is journaled, and a handle connecting the eccentrics together and normally bearing on the said hand-operated device when the worm is meshing with the worm wheel.

In testimony whereof I have signed my name to this specification in the presence of two subscribing witnesses.

FRED VANCE McDONNELL.

Witnesses:
 Roy E. Rapsch,
 J. A. Butterworth.

---

Copies of this patent may be obtained for five cents each, by addressing the "Commissioner of Patents, Washington, D. C."